(12) United States Patent
Dudgeon et al.

(10) Patent No.: US 8,577,840 B2
(45) Date of Patent: Nov. 5, 2013

(54) REPLICATION OF DATA SETS

(75) Inventors: Kyle B. Dudgeon, Vail, AZ (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/342,736

(22) Filed: Jan. 3, 2012

(65) Prior Publication Data

US 2013/0173542 A1    Jul. 4, 2013

(51) Int. Cl.
*G06F 11/14* (2006.01)
*G06F 12/00* (2006.01)

(52) U.S. Cl.
USPC .................. 707/626; 707/674; 714/6; 714/15

(58) Field of Classification Search
USPC ......................................................... 707/626
See application file for complete search history.

(56) References Cited

U.S. PATENT DOCUMENTS

| | | | | |
|---|---|---|---|---|
| 8,005,798 | B2 * | 8/2011 | Lehr et al. | 707/674 |
| 2003/0140204 | A1 | 7/2003 | Ashton et al. | |
| 2004/0205110 | A1 * | 10/2004 | Hinshaw | 709/201 |
| 2008/0046483 | A1 * | 2/2008 | Lehr et al. | 707/204 |
| 2009/0132995 | A1 * | 5/2009 | Iborra et al. | 717/106 |
| 2010/0023725 | A1 * | 1/2010 | Huber et al. | 711/173 |
| 2010/0281000 | A1 * | 11/2010 | Lehr et al. | 707/675 |
| 2011/0161733 | A1 * | 6/2011 | Thomson et al. | 714/16 |
| 2011/0173154 | A1 | 7/2011 | Chauvet et al. | |
| 2011/0307745 | A1 * | 12/2011 | Mccune et al. | 714/54 |

OTHER PUBLICATIONS

Mary Lovelace et al., "DFSMSV1.10 and EAV Technical Guide", Redbooks, ibm.com/redbooks, Sep. 2009.

* cited by examiner

*Primary Examiner* — Shyue Jiunn Hwa
(74) *Attorney, Agent, or Firm* — Kunzler Law Group

(57) ABSTRACT

An approach that allows for replicating data sets that have different attributes. A logical copy operation may not be possible from a source data set to a target data set due to differences between their respective attributes. The source data set may have obsolete attributes that prevent a logical copy to a target data set with supported attributes. The presented solution may involve allocating an intermediate data set with the same attributes as the source data set. The intermediate data set may be allocated with the same obsolete attributes as the source data set. The approach may also involve executing a logical copy operation from the source data set to the intermediate data set. A standard copy operation that reformats the data may be executed on the intermediate data set to the target data set.

16 Claims, 5 Drawing Sheets

REPLICATION OF DATA SETS

FIELD

The subject matter disclosed herein relates to improved operations for copying data sets.

BACKGROUND

A number of storage systems today offer what can be broadly referred to as logical copy operations. Logical copy operations are intended to provide fast replication of data. For example, IBM offers a logical copy operation entitled Flash-Copy that is often used with IBM's virtual storage access method (VSAM) storage systems. A logical copy operation is a process that creates a logical copy of data by associating data stored at a source location (which is the data being copied) with a target location (which will become the copy of the data). The logical copy operation may establish the relationship between the source location and the target location with a logical operation at first; for example, the logical copy operation may establish a series of pointers to associate data at the source location with corresponding data at the target location. The data may then be physically copied from the source location to the target location as a background operation.

Logical copy operations often occur on the storage device hardware itself, without involvement by the host operating system. As a result, the data, and the organization of the data in the data set, cannot be changed during the logical copy operation. If changes are necessary, the logical copy operation is not an option, and the copy operation is executed by the host operating system using a standard copy operation using traditional input/output (I/O).

One situation where changes in the data set, or its organization, can cause problems arises with changes in attributes in a VSAM system. Supported control interval (CI) and control area (CA) sizes may change over time. When a data set with an obsolete CI or CA size is copied, FlashCopy is not available as the target data set (where the data will be copied to) will have to be allocated with the new, supported CI and CA sizes. The host operating system is required to rearrange the records in the CIs to fit within the new CI sizes and/or CA sizes.

As a result, when an administrator installs a new version of VSAM, jobs and operations that would previously run in minutes could take hours on the first run. The cause is the source data sets that used to be eligible for FlashCopy which now have to be copied using much slower standard I/O operations. This can cause the system to miss service level agreements (SLAs), backup windows, and other deadlines.

BRIEF SUMMARY

An approach to improved replication of obsolete data sets. The summary that follows is for convenience, and is not a limitation on the claims.

The invention may be realized as a computer program product stored on a computer readable storage medium for replicating a source data set. The computer program product may comprise instructions for determining that a logical copy operation of a source data set with first attributes to a target data set with second attributes is prevented by differences between the first attributes and the second attributes. One or more of the first attributes may be obsolete attributes, while the second attributes may be supported attributes. The computer program product may also be configured to allocate an intermediate data set having the first attributes and to execute the logical copy operation on the source data set to the intermediate data set. The computer program product may also be configured to execute a standard copy operation on the intermediate data set to the target data set, the standard copy operation formatting data in the intermediate data set to have the second attributes in the target data set.

Allocating the intermediate data set may involve setting a force indicator that allows allocation of the intermediate data set with obsolete attributes. The computer program product may also be configured to release a lock on the source data set in response to the logical copy operation on the source data set to the intermediate data set completing. The computer program product may delete the intermediate data set in response to the standard copy operation on the intermediate data set to the target data set completing.

Determining that the logical copy operation is prevented by differences between the first attributes and the second attributes may involve monitoring for events generated by the rejection of a request to execute the logical copy operation on the source data set to the target data set. For example, the event may be, in a VSAM system, an ADR737W error message.

The present invention may be realized in a variety of forms. The present invention may be realized as a computer program product, a system, a method, or other form. References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
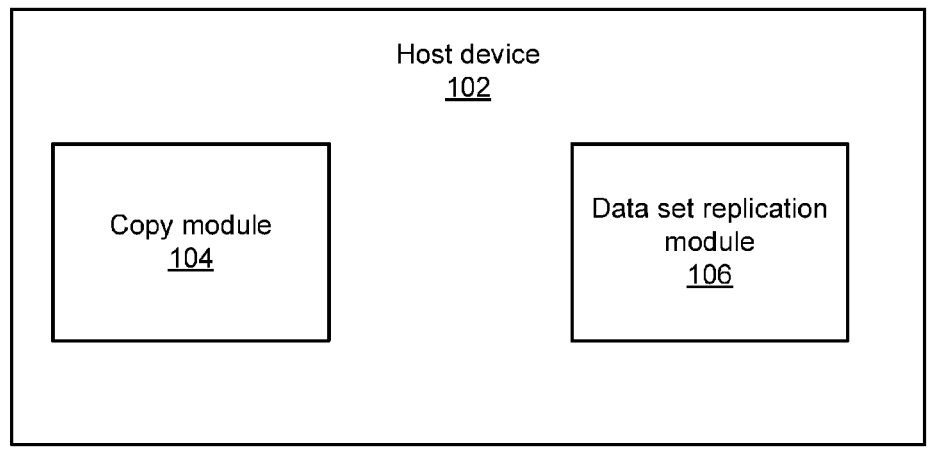
FIG. 1 is an illustrative block diagram showing one embodiment of a system comprising a host device, a data set replication module, and a storage device.
Figure 1:
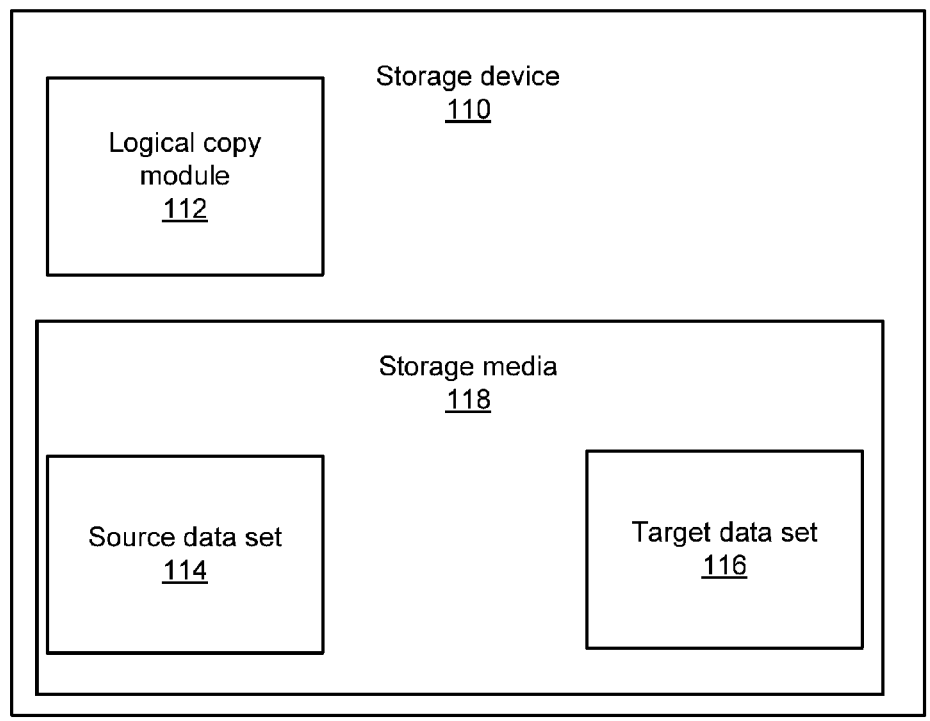

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. The computer readable medium may be non-transitory.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 including a host device 102 in communication with a storage device 110. The host device 102 may be any appropriate device with a processor and memory that communicates data with the storage device 110. The host device 102 typically includes an operating system that coordinates the use of resources between one or more applications running on the host device 102 and performs other functions traditionally handled by an operating system. The host device 102 may include a copy module 104 and a data set replication module 106.

The copy module 104 may be configured to copy data stored on the storage media 118. The copy module 104 copies data using standard copy operations. As used herein, a standard copy operation refers to a copy operation in which the host device 102 and/or its operating system have responsibilities in reading data to be copied out of the storage device 110 and writing the data to be copied back to the storage device 110. In a typical embodiment, the data is read into buffers and then written out again. The host device 102 may change the attributes of the data as part of the standard copy operation. For example, the data may be organized in a first format at its source location, and be reorganized into a second format at its destination location.

The storage device 110 may be any appropriate device including storage media 118 for providing nonvolatile storage of data. The storage device 110 may use hard disk drives, tape, solid state memory, or other appropriate storage media 118. The storage device 110 receives requests associated with data stored on the storage media 118 from the host device 102. The storage device 110 may retrieve data from the storage media 118 in response to a read request, or write data to the storage media 118 in response to a write request. The storage device 110 may support other operations as well.

In certain embodiments, the storage device 110 includes a logical copy module 112 that executes logical copy operations on the storage device 110. As used herein, a logical copy operation refers to a substantially instantaneous copy operation that occurs on the storage device 110, without the host device 102 participating in moving the data, and that creates a logical relationship between the source data and the target data. One example of a logical copy operation is IBM's FlashCopy operation. As noted above, the logical copy operation is executed by the storage device 110 without participation by the host device 102. For example, the operating system on the host device 102 may send a command to the logical copy module 112 to copy the source data set 114 to a target data set 116. The logical copy module 112 may execute the logical copy operation directly, without the host device 102 performing I/O in support thereof. The logical copy module 112 may report to the host device 102 when the logical copy operation is complete.

FIG. 1 also depicts a source data set 114 and a target data set 116. A data set, as used in this application, refers broadly to a logical grouping of data including VSAM data sets, files, and other groupings. The source data set 114 is the data set that is to be copied; the target data set 116 is the data set that is the copy of the source data set 114, located at a separate location.

The source data set 114 and the target data set 116 each have attributes. The term attributes refers broadly to the structure of the data and the characteristics of the data sets that are distinct from the actual data in the data set. For example, CA and CI sizes are examples of attributes. In certain releases of VSAM, a data set could have an imbedded index, which is another example of an attribute. In these examples, the actual data in the source data set 114 and the target data set 116 is identical after the copy operation is complete; however, the organization of that data may be different due to the differences in the attributes.

As mentioned above, a host device 102 may need to copy a source data set 114 to a target data set 116. The host device 102 may check whether a logical copy operation from the source data set 114 to the target data set 116 is possible. If possible, the host device 102 may send a command to the logical copy module 112, which may logically copy the source data set 114 to the target data set 116 without need for the host device 102 (and its associated operating system) to participate in the copy operation.

In certain embodiments, a logical copy operation from the source data set 114 to the target data set 116 may not be possible. One situation where this problem arises is when the attributes of the target data set 116 (which may be referred to as second attributes) are different from those of the source data set 114 (which may be referred to as first attributes). For example, a DSS program on the host device 102 may need to copy the source data set 114. The DSS program may, in preparation for the copy, allocate a target data set 116 to which data in the source data set 114 will be copied. The target data set 116 is allocated using attributes that are supported by the version of VSAM running on the host device 102. The DSS may then request that the data in the source data set 114 be copied to the target data set 116. Assuming that the source data set 114 was allocated using an older version of VSAM, the source data set 114 may have obsolete attributes that are no longer supported. The differences between the first and second attributes prevent a logical copy operation from occurring. As a result, the DSS may have to use the copy module 104 (rather than the logical copy module 112) to perform a standard copy operation using standard I/O to copy the data in the source data set 114 to the target data set 116. The standard copy operation reformats the data in the source data set 114 such that it is copied to the target data set 116 with the second attributes.

An obsolete attribute is an attribute of a data set that is no longer supported by the current version of application. Use of the attribute may cause an error. Alternatively, use of the attribute may cause a warning. The obsolete attribute may be completely unsupported, or its use may be deprecated.

The first attributes of the source data set 114 need not be obsolete attributes; the first attributes are different from the second attributes, and the difference prevents a logical copy operation from occurring between the source data set 114 and the target data set 116. That one or more of the first attributes is obsolete is simply one example of a common cause of differences that may prevent a logical copy operation.

As discussed above, if the source data set 114 cannot be copied to the target data set 116 using a logical copy operation, the copy module 104 performs a standard copy operation. The standard copy operation may take a much longer time than the logical copy operation. The source data set 114 is typically locked while the standard copy operation is taking place; as a result, access to the source data set 114 may be cut off until the copy module 104 has completed the copy operation. Having the access to the source data set 114 cut off may cause unacceptable delays in the operations on the host device 102.

The data set replication module 106 may be configured to allow for fast replication of the source data set 114 even though a logical copy operation from the source data set 114 to the target data set 116 is not possible due to differences in their respective attributes. In this way, the data set replication module 106 may help alleviate the problems associated with having to perform a standard copy operation on the source data set 114.

In one embodiment, the data set replication module 106 is configured to determine that a logical copy operation of the source data set 114 with first attributes to a target data set 116 is prevented by differences between the first attributes and the second attributes. The data set replication module 106 may, in response to making this determination, allocate an intermediate data set that has the first attributes, and execute a logical copy operation on the source data set to the intermediate data set. The data set replication module 106 may then execute a standard copy operation on the intermediate data set to the target data set. The standard copy operation will format the data in the source data set 114 to have the second attributes of the target data set 116.

Figure 2:
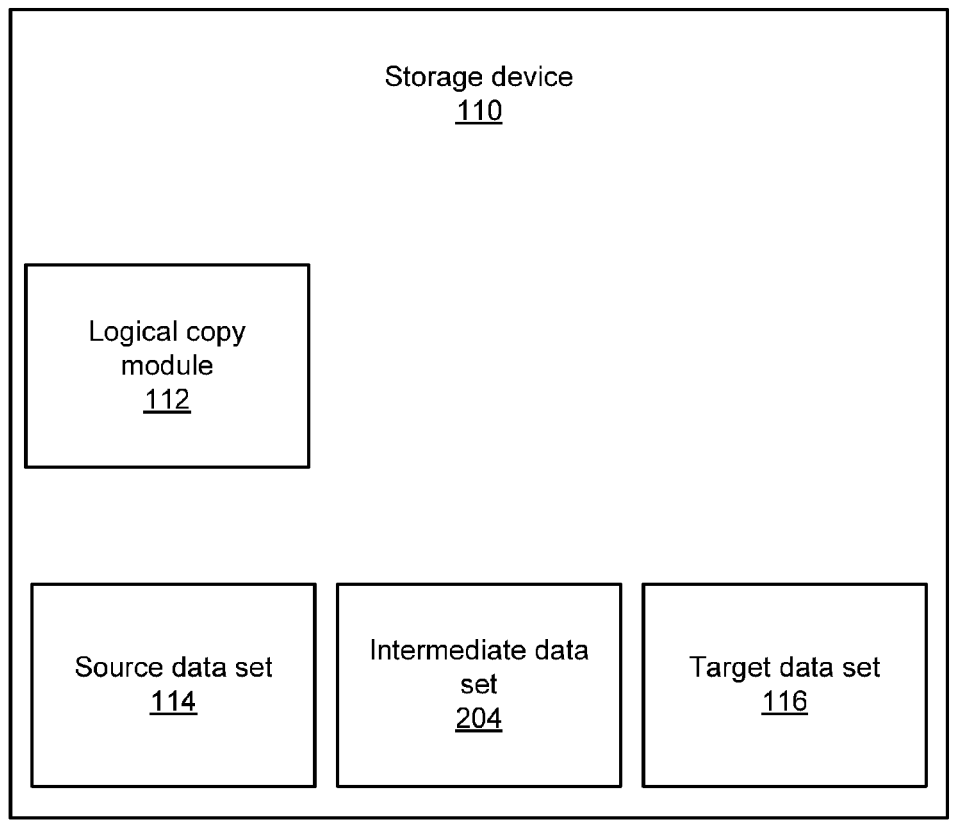
FIG. 2 is an illustrative block diagram showing one embodiment of a system comprising a host device, a data set replication module, and a storage device, where an intermediate data set is allocated on the storage device.

FIG. 2 shows one embodiment of a system 200 including a host device 102 and a storage device 110, where the data set replication module 106 provides fast replication of the source data set 114. The source data set 114 has first attributes. The target data set 116 has second attributes. There is at least one difference between the first attributes and the second attributes. The differences between the first attributes and the second attributes prevent a logical copy operation from occurring.

The data set replication module 106 may be configured to determine that the logical copy operation of the source data set 114 and the target data set 116 is prevented by differences between the first attributes and the second attributes. As noted above, one example of differences that prevent a logical copy operation from occurring is that one or more of the first attributes are obsolete attributes, while the second attributes are currently supported attributes.

In certain embodiments, determining that the logical copy operation is prevented involves monitoring for events generated by a rejection of a request to execute the logical copy operation on the source data set 114. For example, in a VSAM system, DSS may monitor for attempts to use FlashCopy that are rejected. The monitoring may be done internally by a copy product such as DFSMSdss. The monitoring may also be done outside the copy product. For example, the data set replication module 106 may monitor for messages such as a ADR737W message indicating that the source data set 114 must be copied using a utility such as the copy module 104, as opposed to the FlashCopy operation performed by the logical copy module 112. The data set replication module 106 may investigate the return code of the event in order to confirm that the rejection of the logical copy operation was caused by differences between the first attributes and the second attributes.

The data set replication module 106 may then allocate an intermediate data set 204 that has the first attributes of the source data set 114. In certain embodiments, this involves allocating an intermediate data set 204 with one or more obsolete attributes. The data set replication module 106 may be configured to set a force indicator that allows the allocation of the intermediate data set 204 with obsolete attributes.

In one embodiment, the force indicator causes the software component allocating the intermediate data set 204 to bypass the check for obsolete attributes. The force indicator may cause the software component to allocate the intermediate data set 204 using obsolete code paths associated with the first attributes. The data set replication module 106 may be configured to suppress any warnings or errors that might otherwise occur if a data set is allocated with obsolete attributes, or if obsolete code paths are used.

The data set replication module 106 may also be configured to execute a logical copy operation on the source data set 114 to the intermediate data set 204. The data set replication module 106 may, for example, invoke the logical copy module 112. Because the attributes of the source data set 114 and the intermediate data set 204 are the same, a logical copy operation is likely to execute successfully between the source data set 114 and the intermediate data set 204.

The data set replication module 106 may release a lock on the source data set 114 in response to the logical copy operation on the source data set 114 to the intermediate data set 204 completing. The data set replication module 106 may do so even though the data has not been copied to the target data set 114. As a result, the source data set 114 may be quickly available for other processes and operations occurring on the host device 102.

The data set replication module 106 may also be configured to execute a standard copy operation on the intermediate data set 204 to the target data set 116 using the copy module 104. The standard copy operation formats the data in the intermediate data set 204 to have the second attributes of the target data set 116. For example, if the intermediate data set 204 stores data in obsolete CI and CA sizes, the standard copy operation reformats the data such that the data is stored in currently supported CI and CA sizes in the target data set 116. The data set replication module 106 may delete the intermediate data set 204 in response to the standard copy operation completing.

Figure 3:
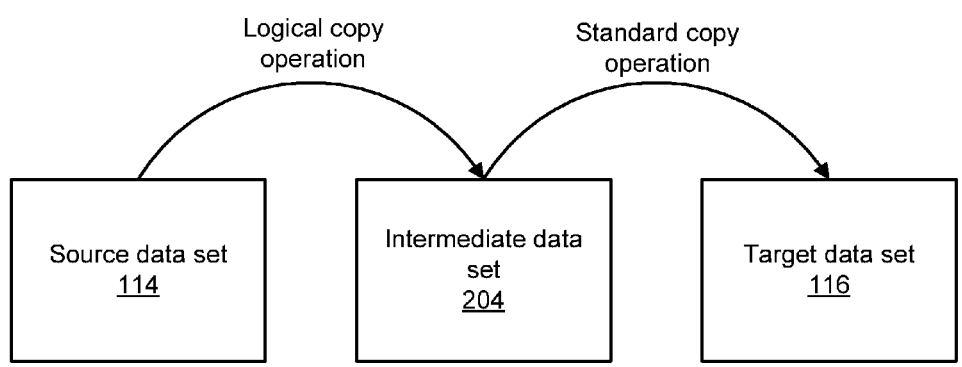
FIG. 3 is an illustrative block diagram showing one embodiment of an approach to copying data from a source data set to a target data set.

FIG. 3 shows one embodiment of a process of a source data set 114 being copied to a target data set 116. As described above, the source data set 114 has first attributes. Some of the first attributes may be obsolete. A software program may allocate a target data set 116 with second attributes. The target data set 116 may be allocated with attributes that are currently supported by the software program. The differences between the first attributes and the second attributes may prevent a logical copy operation from occurring between the source data set 114 and the target data set 116.

Rather than perform a standard copy operation between the source data set 114 and the target data set 116, the data set replication module 106 may cause allocation of an intermediate data set 204 that has the first attributes of the source data set 114. As a result, the data set replication module 106 may be allocating the intermediate data set 204 with obsolete attributes. The intermediate data set 204 is allocated with the same attributes as the source data set 114, regardless of whether or not those attributes are supported. The data set replication module 204 then causes a logical copy operation to take place that copies the data in the source data set 114 to the intermediate data set 204.

While the logical copy operation is occurring, a lock may be placed on the source data set 114 as part of normal operation. When the logical copy operation is complete, the data set replication module 106 may cause the lock on the source data set 114 to be released. As a result, the source data set 114 is once again quickly available for other operations. As noted above, the logical copy operation establishes a logical relationship between the source data set 114 and the intermediate data set 204. The actual data in the source data set 114 may be moved to the intermediate data set 204 as part of a background process. Changes to the source data set 114 that affect unmoved data may cause that data to be pushed to the intermediate data set 204. Those of skill in the art will be familiar with the operations of a logical copy operation such as Flash-Copy.

When the lock on the source data set 114 is released, the source data set 114 becomes available, and applications that were waiting for the source data set 114 to be copied can once again resume. Because the source data set 114 was copied to the intermediate data set 204 using a logical copy operation, the waiting time is usually far less than it would have been for a standard copy operation.

The data set replication module 106 may cause a standard copy operation to copy the intermediate data set 204 to the target data set 116 using a standard copy operation. The data set replication module 106 may invoke the copy module 104 to perform the standard copy operation between the intermediate data set 204 and the target data set 116. The data set replication module 106 may wait until the logical copy operation is complete before initiating the standard copy operation. The data set replication module 106 need not wait until the data is physically moved from the source data set 114 to the intermediate data set 204 as part of the logical copy operation before initiating the standard copy operation.

In certain embodiments, when the standard copy operation from the intermediate data set 204 to the target data set 116 completes, the data set replication module 106 deletes the intermediate data set 204. As a result of the standard copy operation, the target data set 116 is available for use and the data therein is reformatted to have the second attributes.

Figure 4:
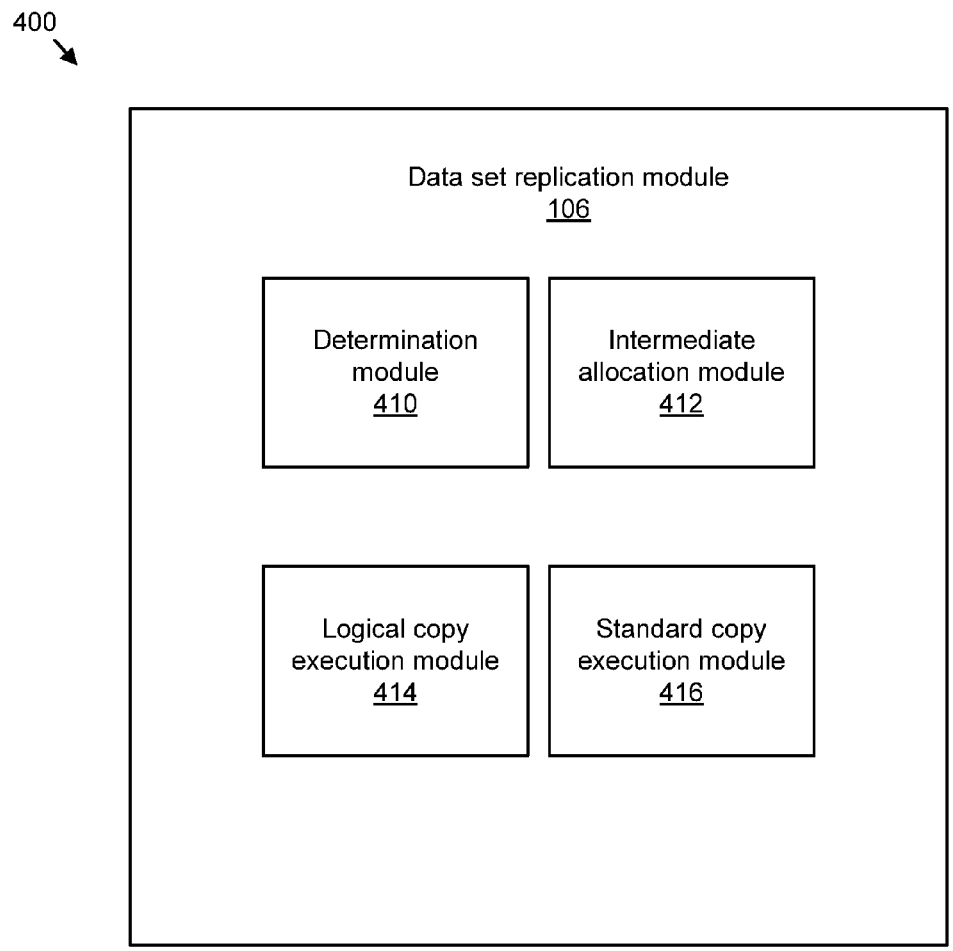
FIG. 4 is an illustrative block diagram showing one embodiment of a data set replication module.

FIG. 4 shows one embodiment of a data set replication module 106. In the depicted embodiment, the data set replication module 106 includes a determination module 410, an intermediate allocation module 412, a logical copy execution module 414, and a standard copy execution module 416. The data set replication module 106 may be located in the host device 102. In certain embodiments, the components of the data set replication module 106 are distributed across one or more physical devices, including the storage device 110.

The determination module 410 may be configured to determine that a logical copy operation of a source data set 114 with obsolete attributes to a target data set 116 with supported attributes is prevented by differences between the obsolete attributes and the supported attributes. As described above, the determination module 410 may monitor for error messages and other events that indicate that a requested logical copy operation between the source data set 114 and the target data set 116 is not possible.

The intermediate allocation module 412 may be configured to allocate an intermediate data set 204 having obsolete attributes that are identical to the obsolete attributes of the source data set 114. The intermediate allocation module 412 may allocate the intermediate data set 204 in response to the determination module 410 determining that the logical copy operation directly between the source data set 114 and the target data set 116 is not possible. The intermediate allocation module 412 may also include a force indicator when allocating the intermediate data set 204. The force indicator may force the appropriate system on the host device 102 (such as VSAM) to allocate the intermediate data set 204 using one or more obsolete attributes, even though such an attempt would normally result in an error.

The data set replication module 106 may also include a logical copy execution module 414 that executes a logical copy operation between the source data set 114 and the intermediate data set 204. The logical copy execution module 414 may execute the logical copy operation by invoking the logical copy module 112 that is situated on the storage device 110. The logical copy execution module 414 may provide the logical copy module 112 with the location information for the source data set 114 and the intermediate data set 204.

The data set replication module 106 may also include a standard copy execution module 416. The standard copy execution module 416 may be configured to execute a standard copy operation on the intermediate data set 204 to the target data set 116. The standard copy operation formats the data in the source data set 114 to have the supported attributes of the target data set 116. The standard copy execution module 416 may execute the standard copy operation by, for example, invoking the copy module 104 on the host device 102.

Figure 5:
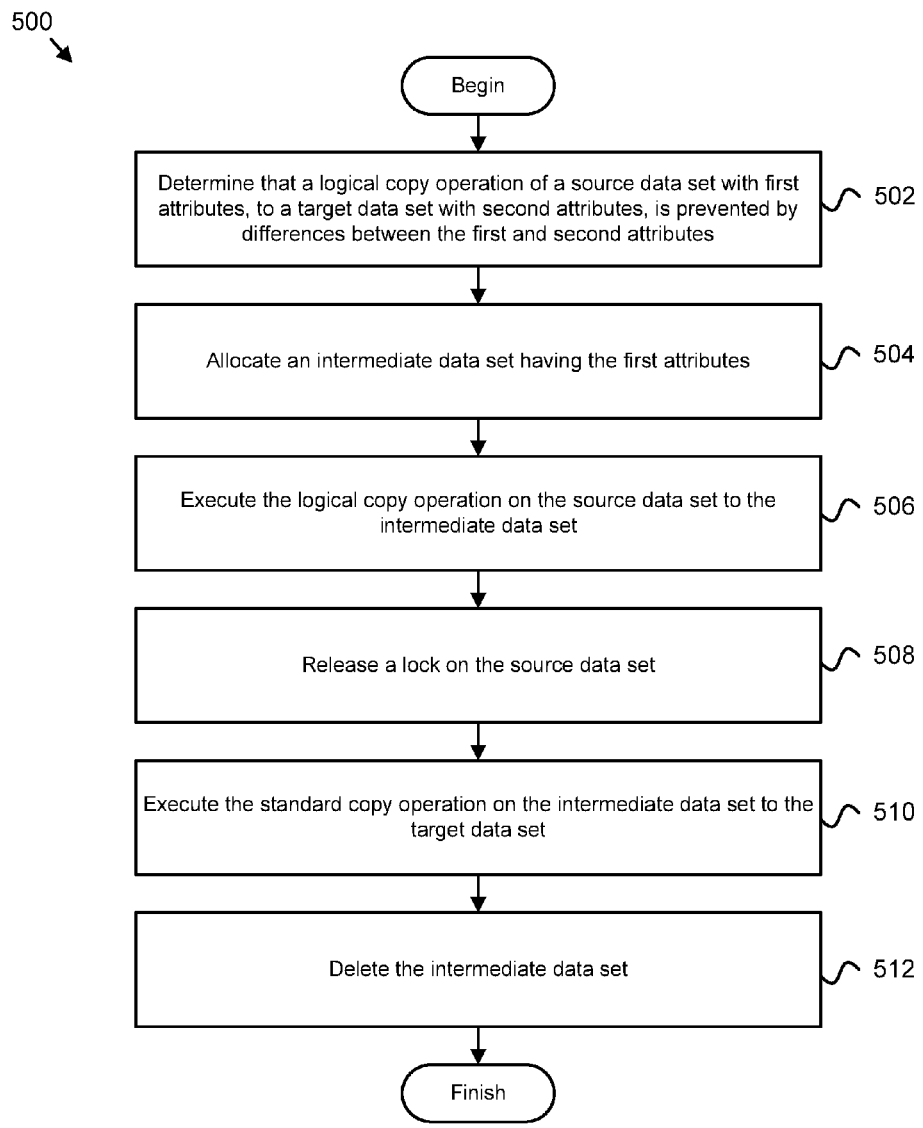
FIG. 5 is an illustrative flow chart diagram showing one embodiment of an approach to replicating data sets.

FIG. 5 shows one embodiment of a method 500 for performing improved data set replication. In one embodiment, the method 500 begins with determining 502 that a logical copy operation between a source data set 114 with first attributes and a target data set 116 with second attributes is prevented by differences between the first and second attributes. The method 500 may also involve, in response, allocating 504 an intermediate data set 204 that has the first attributes of the source data set 114.

The method 500 may also involve executing 506 a logical copy operation on the source data set 114 to the intermediate data set 204, and releasing 508 a lock on the source data set 114. The method 500 may further involve executing 510 a standard copy operation on the intermediate data set 204 to the target data set 116. The standard copy operation formats the data in the intermediate data set 204 to have the second attributes in the target data set 116. The method 500 may also involve deleting 512 the intermediate data set 204.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored on a non-transitory computer-readable storage medium, the computer program product comprising instructions for:
    determining that a logical copy operation of a source data set with first attributes to a target data set with second attributes is prevented by differences between the first attributes and the second attributes, wherein one or more of the first attributes are obsolete attributes and the second attributes are supported attributes, and wherein an attribute pertains to one or more of
    the structure of the data within a data set;
    the organization of the data within a data set; and
    the size of the data within a data set;
    allocating an intermediate data set having the first attributes;
    executing a logical copy operation on the source data set to the intermediate data set, wherein the logical copy operation comprises the storage device of the source data set creating a copy of the data in the source data set at the storage location of the intermediate data set;
    executing a standard copy operation on the intermediate data set to the target data set, wherein the standard copy operation comprises:
    reading the data in the intermediate data set into a buffer; and
    writing the data in the buffer to the storage location of the target data set, wherein the data written to the storage location of the target data set has the second attributes.

2. The computer program product of claim 1, wherein allocating the intermediate data set having the first attributes further comprises setting a force indicator that allows allocation of the intermediate data set with obsolete attributes.

3. The computer program product of claim 1, further comprising releasing a lock on the source data set in response to the logical copy operation on the source data set to the intermediate data set completing.

4. The computer program product of claim 1, further comprising deleting the intermediate data set in response to the standard copy operation on the intermediate data set to the target data set completing.

5. The computer program product of claim 1, wherein determining that the logical copy operation is prevented further comprises monitoring for an event generated by a rejection of a request to execute the logical copy operation of the source data set.

6. The computer program product of claim 5, wherein the event is an error message.

7. A system comprising:
    a server; and
    an apparatus executing at least partially on the server, the apparatus comprising:
    a logical copy module for performing a logical copy operation of a source data set to a target data set;
    a data set replication module comprising instructions for:
    determining that a logical copy operation of a source data set with first attributes to a target data set with second attributes is prevented by differences between the first attributes and the second attributes, wherein one or more of the first attributes are obsolete attributes and the second attributes are supported attributes, and wherein an attribute pertains to one or more of
    the structure of the data within a data set;
    the organization of the data within a data set; and
    the size of the data within a data set;
    allocating an intermediate data set having the first attributes;
    executing a logical copy operation on the source data set to the intermediate data set, wherein the logical copy operation comprises the storage device of the source data set creating a copy of the data in the source data set at the storage location of the intermediate data set;
    executing a standard copy operation on the intermediate data set to the target data set, wherein the standard copy operation comprises:
    reading the data in the intermediate data set into a buffer; and
    writing the data in the buffer to the storage location of the target data set, wherein the data written to the storage location of the target data set has the second attributes.

8. The system of claim 7, wherein allocating the intermediate data set having the first attributes further comprises setting a force indicator that allows allocation of the intermediate data set having obsolete attributes.

9. The system of claim 7, the data set replication module further comprising instructions for releasing a lock on the source data set in response to the logical copy operation on the source data set to the intermediate data set completing.

10. The system of claim 7, the data set replication module further comprising instructions for deleting the intermediate data set in response to the standard copy operation on the intermediate data set to the target data set completing.

11. The system of claim 7, wherein determining that the logical copy operation is prevented further comprises monitoring for an event generated by a rejection of a request to execute the logical copy operation of the source data set.

12. A method comprising:
determining that a logical copy operation of a source data set with first attributes to a target data set with second attributes is prevented by differences between the first attributes and the second attributes, wherein one or more of the first attributes are obsolete attributes and the second attributes are supported attributes, and wherein an attribute pertains to one or more of
the structure of the data within a data set;
the organization of the data within a data set; and
the size of the data within a data set;
allocating an intermediate data set having the first attributes;
executing a logical copy operation on the source data set to the intermediate data set, wherein the logical copy operation comprises the storage device of the source data set creating a copy of the data in the source data set at the storage location of the intermediate data set;
executing a standard copy operation on the intermediate data set to the target data set, wherein the standard copy operation comprises:
reading the data in the intermediate data set into a buffer; and
writing the data in the buffer to the storage location of the target data set, wherein the data written to the storage location of the target data set has the second attributes.

13. The method of claim 12, further comprising releasing a lock on the source data set in response to the logical copy operation on the source data set to the intermediate data set completing.

14. The method of claim 12, further comprising deleting the intermediate data set in response to the standard copy operation on the intermediate data set to the target data set completing.

15. The method of claim 12, wherein determining that the logical copy operation is prevented further comprises monitoring for an event generated by a rejection of a request to execute the logical copy operation of the source data set.

16. An apparatus comprising:
a determination module that determines that a logical copy operation of a source data set with obsolete attributes to a target data set with supported attributes is prevented by differences between the obsolete attributes and the supported attributes;
an intermediate allocation module that allocates an intermediate data set having obsolete attributes that are identical to the obsolete attributes of the source data set;
a logical copy execution module that executes a logical copy operation on the source data set to the intermediate data set, wherein the logical copy operation comprises the storage device of the source data set creating a copy of the data in the source data set at the storage location of the intermediate data set; and
a standard copy execution module that executes a standard copy operation on the intermediate data set to the target data set, wherein the standard copy operation comprises:
reading the data in the intermediate data set into a buffer; and
writing the data in the buffer to the storage location of the target data set, wherein the data written to the storage location of the target data set has the supported attributes,
wherein at least a portion of the determination module, the intermediate allocation module, the logical copy execution module, and the standard copy execution module comprise of one or more of hardware and executable code, the executable code stored on one or more non-transitory computer readable storage media.

* * * * *